(12) United States Patent
Itoh

(10) Patent No.: US 6,287,140 B1
(45) Date of Patent: Sep. 11, 2001

(54) APPARATUS AND METHOD FOR MAINTAINING CONTINUOUS POWER SUPPLY TO AN ELECTRONIC MOBILE INSTRUMENT WHILE REPLACING A DRAINED BATTERY

(75) Inventor: Masashi Itoh, Hadano (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/450,124

(22) Filed: Nov. 26, 1999

(30) Foreign Application Priority Data

Nov. 27, 1998 (JP) .................................................. 10-354009

(51) Int. Cl.$^7$ ...................................................... H01R 3/00
(52) U.S. Cl. .............................................................. 439/500
(58) Field of Search ..................... 439/500, 502, 439/504, 623, 624, 505, 627; 320/124, 126; 429/96, 99, 100, 98, 97, 131; 361/686; 307/64, 65, 66, 70, 71, 147

(56) References Cited

U.S. PATENT DOCUMENTS

| | | | |
|---|---|---|---|
| 4,075,402 | * | 2/1978 | Okamoto ................................ 429/98 |
| 5,528,460 | * | 6/1996 | Byrd ...................................... 361/752 |
| 5,703,626 | | 12/1997 | Itoh et al. . |
| 6,045,398 | * | 4/2000 | Narita et al. ......................... 439/500 |

* cited by examiner

Primary Examiner—Gary Paumen
Assistant Examiner—Ross Gushi
(74) Attorney, Agent, or Firm—Oblon, Spivak, McClelland, Maier & Neustadt, P.C.

(57) ABSTRACT

An electronic mobile instrument includes at its rear side surface a battery receiving recess which includes a connector configured to receive a detachable. A second connector is also provided to enable replacement of the detachable battery with a spare battery when the detachable connecter is substantially drained. Each connector has an expandable flexible lead wire configured to be connected with a receptacle mounted on a respective of the batteries. The pair of lead wires may be connected to inside portions of the battery receiving recess respectively. A battery mounted in the battery receiving recess can be withdrawn from the battery receiving recess with the connector and expandable flexible lead wire connected thereto, when it has substantially been drained. The other connector then not connected to a battery is also withdrawn with the expandable lead wire each connected thereto to connect with a spare battery. The spare battery can be connected thereto before the drained battery is disconnected from the connector to permit continuous supply of power during a battery replacement.

7 Claims, 5 Drawing Sheets

APPARATUS AND METHOD FOR MAINTAINING CONTINUOUS POWER SUPPLY TO AN ELECTRONIC MOBILE INSTRUMENT WHILE REPLACING A DRAINED BATTERY

CROSS REFERENCE TO RELATED APPLICATIONS

This application claims benefit of priority under 35 USC §120 to Japanese Patent Application No. JP 10-354009 filed in the Japanese Patent Office on Nov. 27, 1998, the entire contents of which are incorporated herein by reference.

BACKGROUND OF THE INVENTION

1. Field of the Invention

The present invention relates to an improved electronic mobile instrument, such as a personal computer, using a detachable battery as a driving source. More particularly, this invention relates to an apparatus and method capable of replacing a drained battery with a spare battery and which does not entail complex switching operations (i.e., turning an electrical switch OFF and ON) and inconvenience of a long waiting time until the electronic mobile instrument restarts its system, as is generally required when an electrical switch is turned OFF and ON.

2. Discussion of the Background

It is well known that a conventional electronic mobile instrument, such as a note book type personal computer (hereinafter referred to as a note book type PC), generally uses a battery as a driving source (electrical power supply) when it is carried outside of an office. The battery is generally detachable to the electronic mobile instrument and capable of being replaced with a spare battery which has been sufficiently charged with electricity, when it has been almost exhausted (i.e., substantially drained). In such a conventional electronic mobile instrument, when the drained battery is replaced with the spare battery, a data generating operation may necessarily be stopped. Therefore data displayed on a display may be removed therefrom and temporarily stored in a memory of the electronic mobile instrument. The electrical switch may then be turned OFF, and the drained battery may be removed from a battery receiving section arranged in the electronic mobile instrument. The spare battery may then be set to the battery receiving section and the electrical switch may be turned ON again so that the electronic mobile instrument can be used again.

However, this operation may force an operator to wait a long time (e.g., a few minutes) until a system of the electronic mobile instrument restarts after the switch is turned ON because a highly developed function of an Operating System (hereinafter referred to as an OS), such as a WINDOWS, is generally installed in the electronic mobile instrument. Accordingly it may take relatively a long time for initializing the system, and an operational efficiency may as a result be greatly lowered. Therefore, a detachable battery is generally strongly expected to last longer.

Further, if a great number of batteries are attached to the electronic mobile instrument, it unavoidably becomes bulky. Further, as described in Laid Open Japanese Patent Applications 6-43974, 4-25914, and 4-195211, it has been proposed to selectively attach a spare battery to the electronic mobile instrument instead of a unit device, such as a floppy disc and a hard disc drives, to make it compact and increase the life of the battery.

However, in such conventional electronic mobile instruments, when the unit device is used in the electronic mobile instrument, and accordingly the spare battery is not attached thereto, the above noted complex battery replacing operation may be required whenever a detachable battery attached thereto as a standard instrument has been substantially drained.

SUMMARY OF THE INVENTION

Accordingly, an object of the present invention is to address and resolve such problems and provide a novel electronic mobile instrument including a battery receiving recess configured to receive a detachable battery as a standard instrument and a spare battery, a pair of connectors each including electrodes configured to connect with a receptacle of a battery, and a pair of flexible lead wires respectively configured to connect respective of the connectors with the electronic mobile instrument. The pair of flexible lead wires have sufficient length so that the detachable battery can be withdrawn from the battery receiving recess along with one of connectors connected.

According to one aspect of the present invention, the pair of connectors have substantially the same shape and function.

According to another aspect of the present invention, the pair of flexible lead wires are expandable from the battery receiving recess.

According to yet another aspect of the present invention, the pair of connectors and flexible lead wires are installed in the battery receiving recess.

According to a further aspect of the present invention, a pair of connector units are configured to support and electrically connect the battery with the electronic mobile instrument.

According to another aspect of the present invention, the pair of connector units are independently movable between an opening position where a battery is connected thereto and a closing position where the battery is brought into the battery receiving recess.

According to yet another aspect of the present invention, the connector units each include a lock mechanism configured to inhibit movement in a closed position.

According to still another aspect of the present invention, the pair of connector units are disposed at respective opposed rear side corners of a body of the electronic mobile instrument.

According to a further aspect of the present invention, a spare battery may be electrically connected to an unused of the two connectors when the detachable battery is substantially drained so as to electrically back up the electronic mobile instrument before the substantially drained detachable battery is disconnected from the connector to which it is connected.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
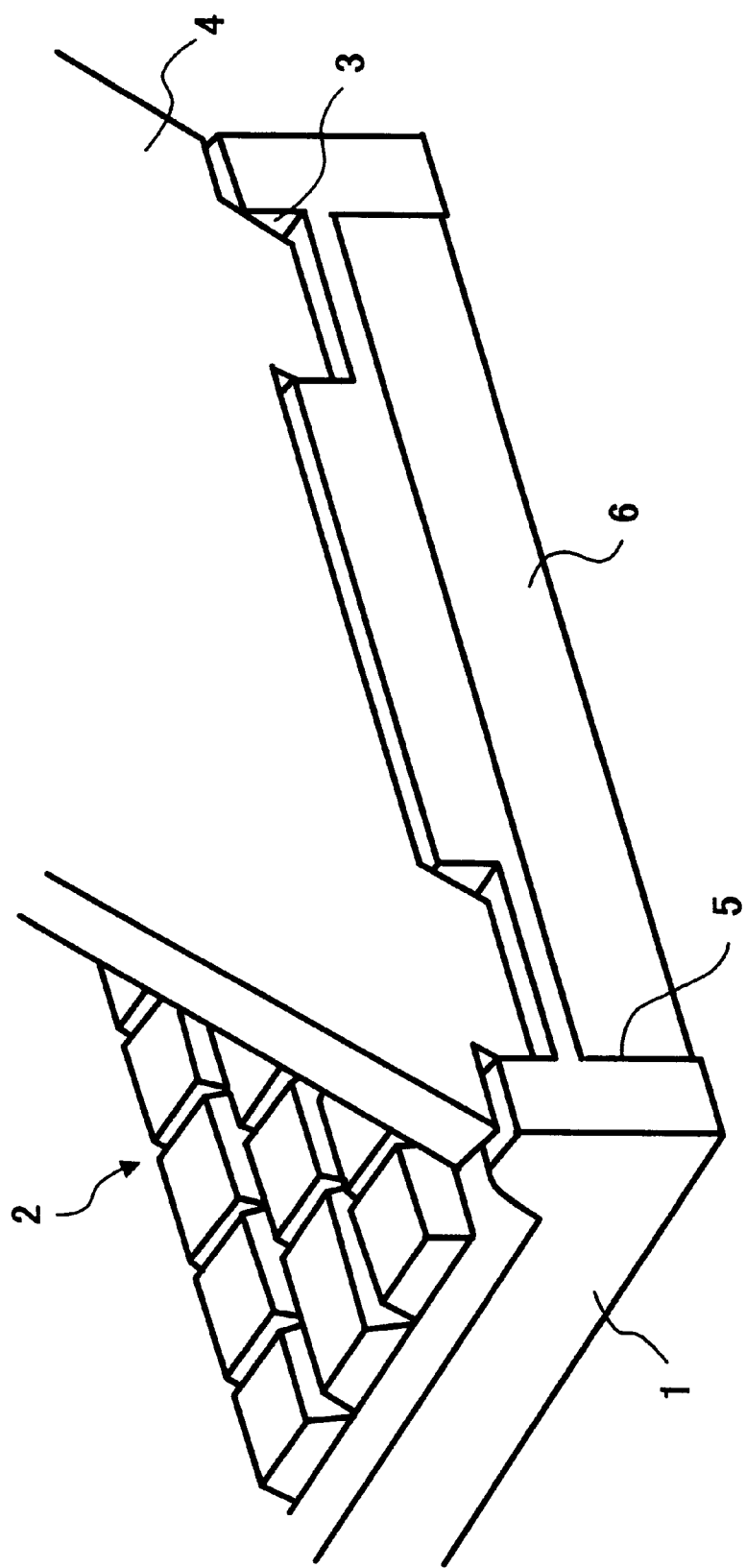
FIG. 1 is a schematic perspective view of an electronic mobile instrument according to the present invention.
Figure 2:
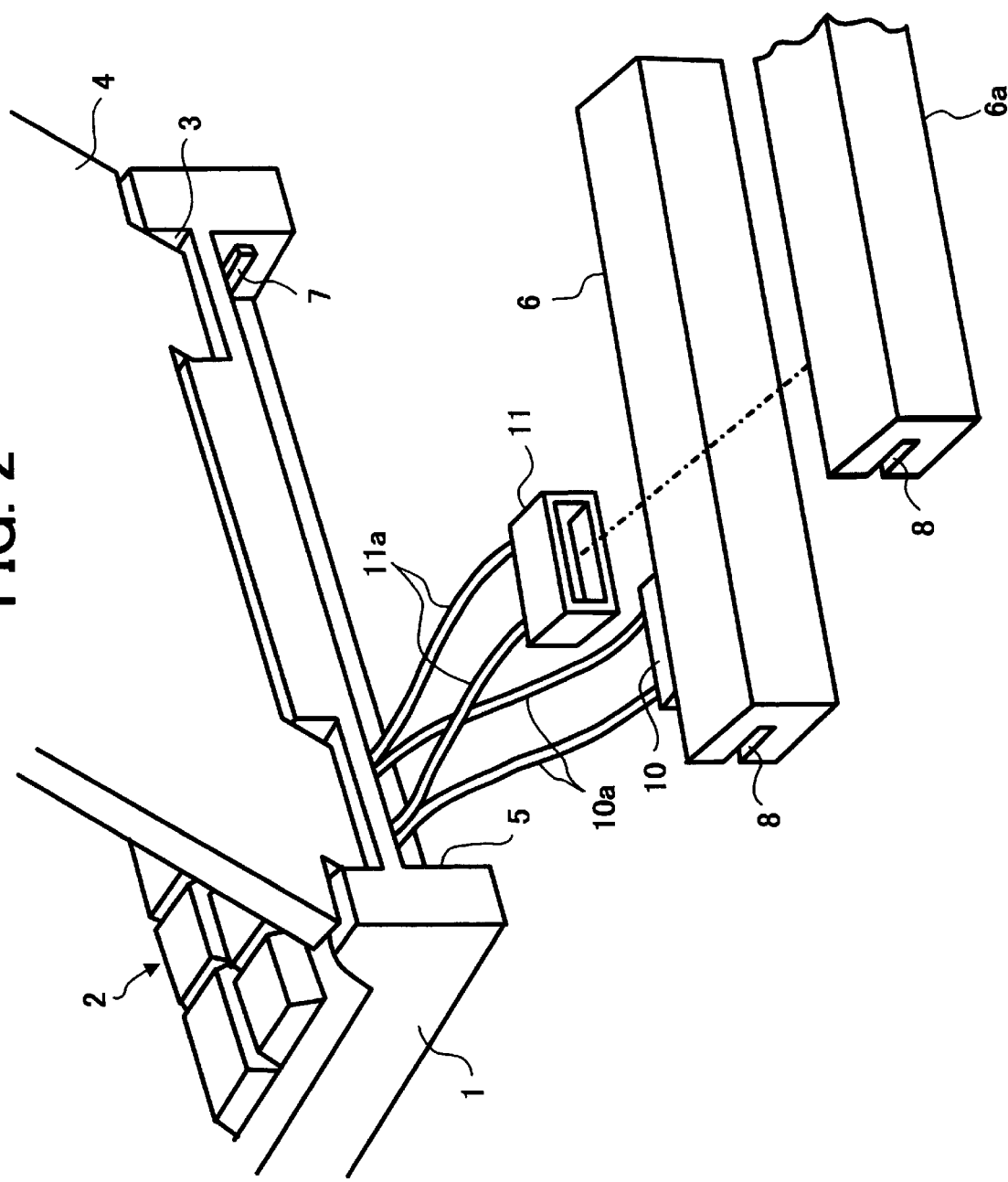
FIG. 2 is a schematic perspective view of the electronic mobile instrument illustrated in FIG. 1, and illustrates a condition where a drained battery is replaced with a spare battery with the spare battery being connected to a second connector and lead wire.

Referring now to the drawings, where like reference numerals identify the same or corresponding parts throughout the several views, and more particularly FIG. 1 thereof, FIG. 1 illustrates an essential part of an electronic mobile instrument, such as a note type PC, as one example of the present invention when viewed from a rear side thereof. FIG. 2 illustrates a battery replacing procedure for the note type PC. As illustrated in FIG. 1, the note type PC may include a keyboard 2 and other electronic devices disposed in a body 1. A display unit 4 may be pivotally mounted around a hinge 3 disposed at a rear side of the body 1. A battery receiving recess 5 having a rectangular cross section may be disposed at a rear side surface of the body 1 as illustrated in FIG. 1. A battery 6 as a standard instrument of the electronic mobile instrument may be formed rectangular so as to fit into the battery receiving recess 5, and include a pair of straight grooves 8 formed on respective side surfaces. The battery receiving recess 5 may include a pair of protruding battery guides 7 (one of them is not illustrated in FIG. 2) mounted on respective inner side surfaces and extending horizontally. Thus, the battery 6 may be detachably set to the battery receiving recess 5 without dropping therefrom due to engagement of the pair of battery guides 7 with the pair of grooves 8.

A spare battery 6a may have substantially the same shape and function as the battery 6.

As one of characteristics of this example, a pair of connectors 10 and 11, each having substantially the same function and structure, may be connected to an inner side wall of the battery receiving recess 5 via a pair of expandable flexible lead wires 10a and 11a respectively.

Further, each of the batteries 6 and 6a may include a receptacle to connect with one of connectors 10 or 11.

For example, as illustrated in FIG. 2, the receptacle of the battery 6 may connect with the connector 10, so that an electrical power can be supplied to the battery 6 through the connector 10.

The other connector 11 may be used when the spare battery 6a is used to replace a substantially drained battery 6 so that electrical power is continuously supplied to the electronic mobile instrument. Thus, when a battery 6 within the battery receiving recess 5 is to be replaced with a spare battery 6a due to having been substantially drained, the battery 6 may be withdrawn therefrom along with the connector 10 and the lead wire 10a in a state as illustrated in FIG. 2. Since the lead wire 10a may have a sufficient flexibility and length, the connector 10 may not be separated from the receptacle of the battery 6 unless the operator applies excessive withdrawal force thereto.

At this stage, the other connector 11 positioned in a portion of the battery receiving recess 5 may be withdrawn therefrom, and connected to a receptacle of the spare battery 6a. The battery 6 may then be disconnected from the connector 10. The connector 10 separated from the receptor of the battery 6 may be returned to a prescribed portion of the battery receiving recess 5, and the spare battery 6a connected to the connector 11 may be installed into the battery receiving recess 5. Thus, the operator can continuously use the electronic mobile instrument while preventing an interruption of the electrical power supply to the electronic mobile instrument. Further, when the above noted spare battery 6a has substantially been drained, the battery 6 having been sufficiently charged with electricity or another battery (not shown) having sufficient charge may be connected to the connector 10 in the same manner, while the drained battery 6a may be separated from the connector 11. The replacement for the battery 6a may be brought into the battery receiving recess 5 and used for a continuous operation.

Figure 3:
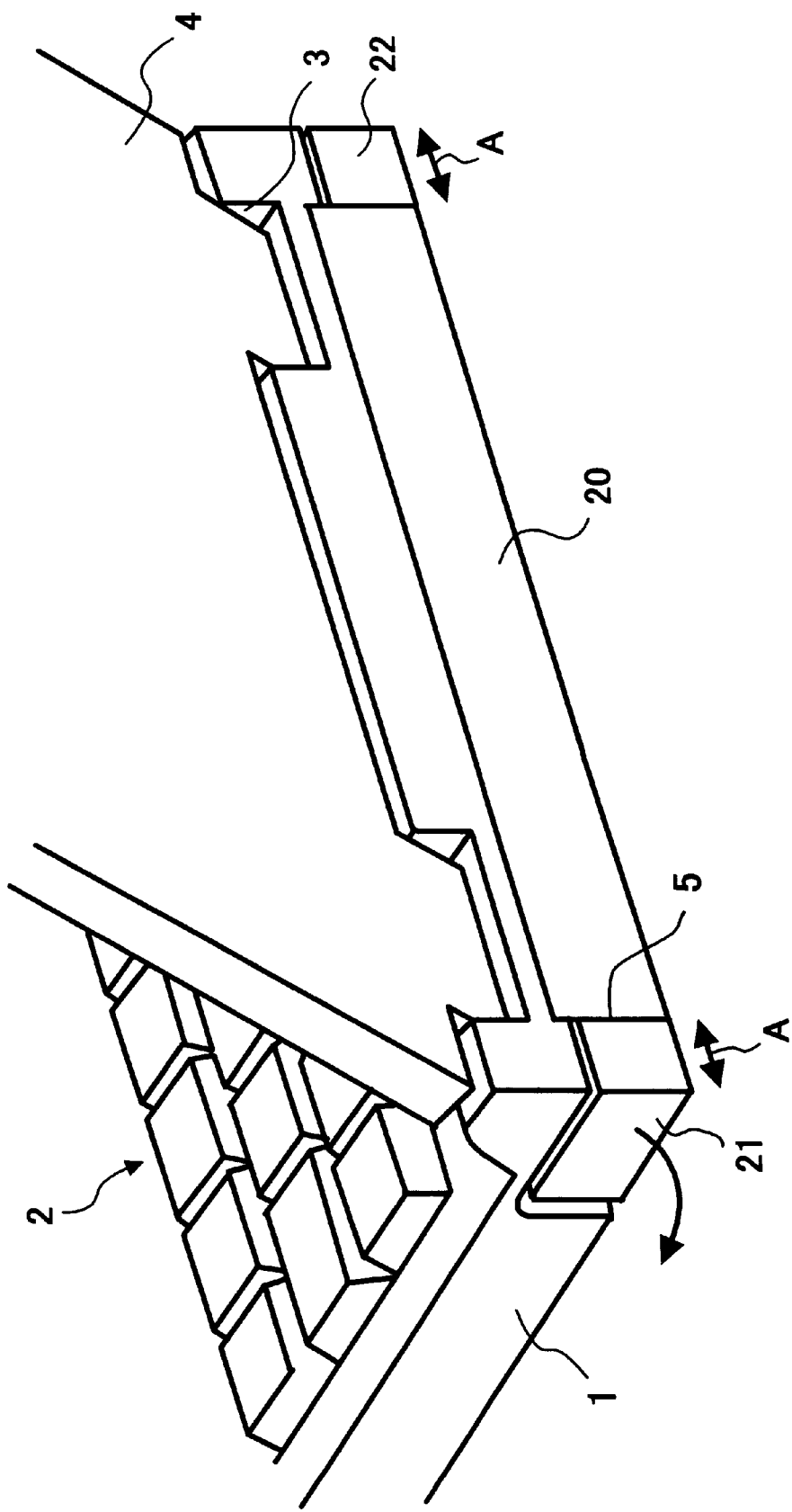
FIG. 3 is a schematic perspective view of another embodiment of the electronic mobile instrument of the present invention, and illustrates battery support connecting units.
Figure 4:
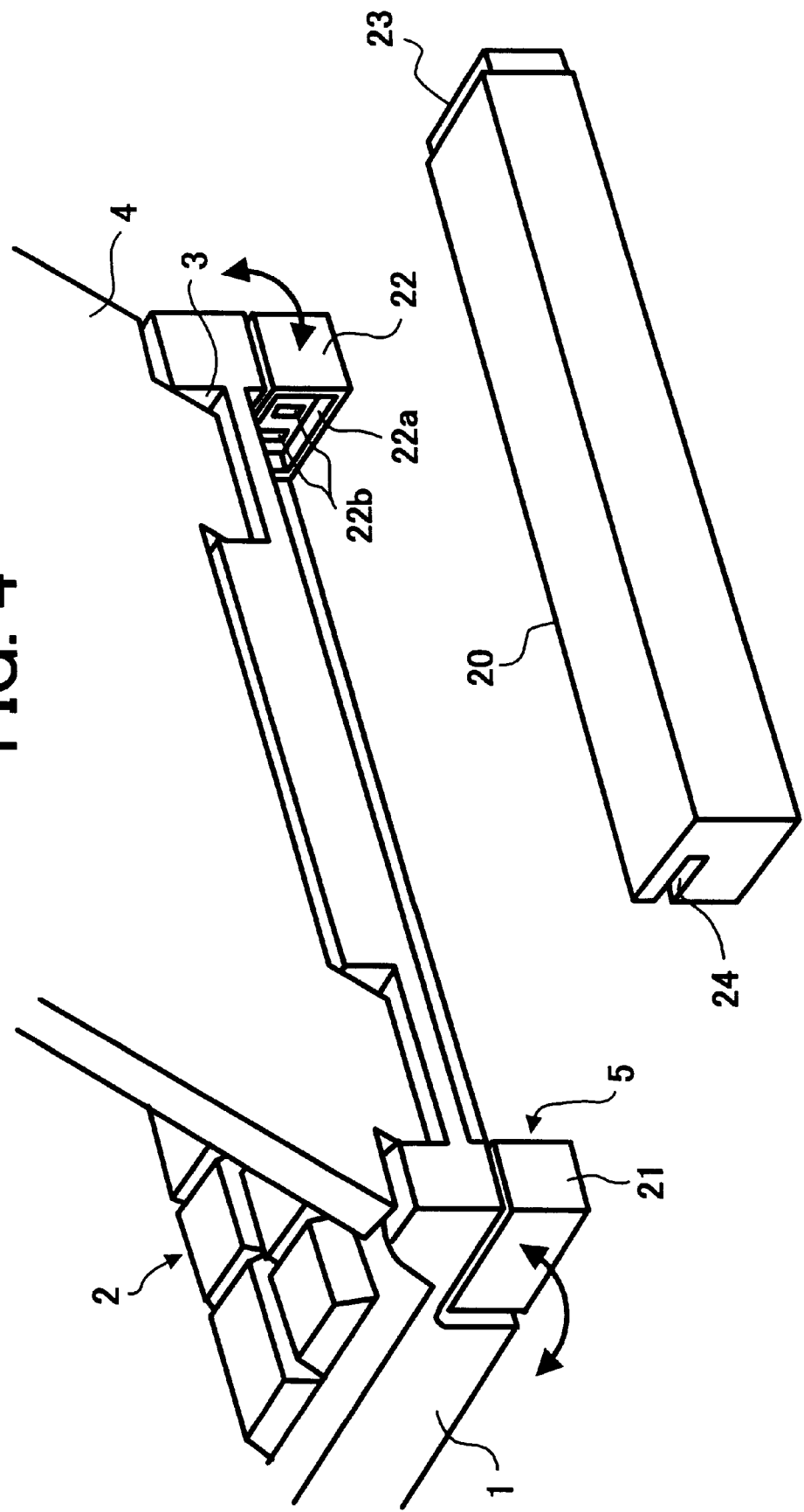
FIG. 4 is a schematic perspective view of the electronic mobile instrument illustrated in FIG. 3, and illustrates a battery receiving recess configured to receive a battery.

A second embodiment is now explained referring to FIGS. 3 and 4. Since the drained battery 6 is withdrawn by the operator from the battery receiving recess 5 in the first example, the connection between the connector 10 and the battery 6 may sometimes accidentally be cleared by the operator due to excessive withdrawal force applied to the battery 6 before the spare battery 6a is connected to a connector 11. This may result in a loss of the electrical power supply and accordingly stoppage of operation of the electronic mobile instrument, with a loss of data input thereto. Then, the second embodiment contemplates that a substantially drained battery 6 may not be withdrawn from the battery receiving recess 5 unless a spare battery 6a is connected to an unused connectors.

Figure 5:
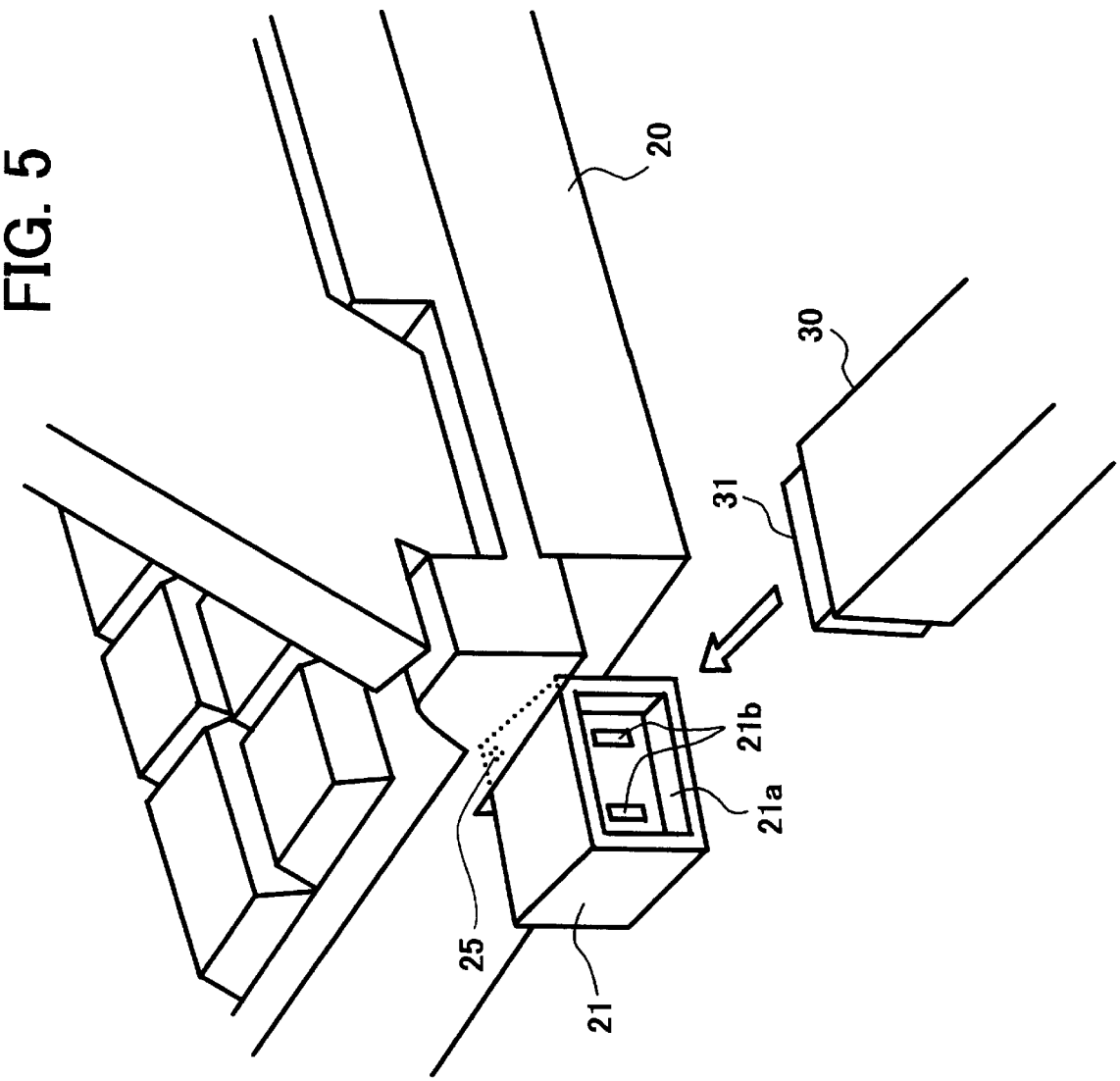
FIG. 5 is a partial perspective view of the electronic mobile instrument illustrated in FIG. 3, and illustrates a condition where a spare battery is inserted into a connecting unit, while a drained battery is still set to the battery receiving.

FIGS. 3 and 4 respectively illustrate an essential construction of the second exemplary electronic mobile instrument and its condition where a battery is removed therefrom. FIG. 5 illustrates a condition where a spare battery is connected to a connector.

A note book type PC may constitute the electronic mobile instrument in this example. Such a note type PC may include a body unit 1 having a keyboard and other electronic devices thereon, and a display unit 4 pivotally supported by a hinge 3 mounted on a rear side end of the body unit 1 so as to swing in backward and forward directions in relation to an operator.

A battery receiving recess 5 may be disposed at a rear side surface of the body section and have a rectangular cross sectional shape. A battery 20 to be set into the battery receiving recess 5 may have a rectangular shape so as to fit into the recess. A pair of connecting units 21 and 22 may be pivotally mounted on rear side corners of the body unit 1 respectively, and independently detachably support the battery 20 therebetween by holding a leading end of the battery. A battery 20 as a standard instrument of the electronic mobile instrument and a spare battery 30 may have substantially the same shape and function. Further, each battery 20, 30 may include a projection 23 formed at the leading end and having a rectangular cross section whose width and length are smaller in size than a middle portion thereof. Further, the leading end may also include plus and minus electrodes (not shown). Further, a straight guiding groove 24 having a prescribed depth and the same width as each battery 20, 30 is formed on a rear side surface of each battery 20, 30, and extends in a lengthwise direction thereon.

Each connector unit 21, 22 may include a lock mechanism (not shown) configured to inhibit its swinging movement by locking thereof when at its closing position as illustrated in FIGS. 3 and 4. The lock mechanism can be configured to clear the lock when more than a prescribed amount of swinging force is applied to the connecting unit in a connecting unit opening direction (i.e., horizontally) by an operator.

As there shown, the connecting units 21 and 22 may include recesses 21a and 22a respectively each having a prescribed rectangular cross section of a width and length, and a prescribed depth. Thus, the projections of the batteries 20 and 30 can fit into the recesses 21a and 22a respectively.

Further, each recess 21a, 22a may in its bottom surface have plus and minus electrodes, which receive electrical power from the battery and convey the same toward the electronic mobile instrument, when the electrodes of the battery are correspondingly connected thereto. The electrodes of each connecting unit 21, 22 may be electrically connected to an electrical equipment (not shown) installed in the body unit 1 of the electronic mobile instrument via a flexible cable (not shown) also disposed therein. Further, a guide projection (not shown) having a prescribed length substantially equal to the width of the battery, accordingly the guiding groove 24, may be formed on a prescribed portion of an inner rear side wall of the battery receiving recess 5. The guide projection is configured to extend laterally and fit into the guiding groove 24 while the battery is brought into the battery receiving recess 5.

When a battery 20 as a standard instrument is newly set to the battery receiving recess 5 as illustrated in FIG. 4, the connecting unit 21 may be opened initially. The projection 23 of the battery 20 may then be inserted into the recess 22a of the connecting unit 22 nearest to the projection 23 in a lengthwise direction of the battery 20. The battery 20 may then be brought into the battery receiving recess 5 while the connecting unit 21 swings toward its closing position and the guiding projection (not shown) fits into the guiding groove 24.

Thus, the battery 20 may be firmly supported by the connecting unit 22 first and then the guiding projection, thereby preventing a drop of the battery 20 therefrom. Since electrical power is supplied to the electronic mobile instrument through the electrodes of the connecting unit 22 holding the projection 23, the other connecting unit 21 remains not utilized for a purpose of conveying the electrical power from a battery. When the battery 20 has substantially been drained and needs to be replaced with a spare battery 30, the connecting unit 21, not being used for the above noted purpose, may be opened to expose an inner side of the recess 21a as illustrated in FIG. 5 without shortly removing the battery 20 from the battery receiving recess 5. The projection 31 of the spare battery 30 may be inserted into the recess portion 21a in a lengthwise direction of the battery 30, and two pairs of electrodes may be correspondingly connected to each other. Electrical power may then be supplied to the electronic mobile instrument from the spare battery 30, and the drained battery 20 may then be removed from the connecting unit 22, i.e., the battery receiving recess 5, because of the electrical power backup of the electronic mobile instrument provided by the connection of the spare battery 30 to the connector unit 22.

After removing the drained battery 20 from the connecting unit 22 and the guiding projection, the connecting unit 21 may swing to its closing position along with the spare battery 30, thereby completing setting the spare battery 30 to the battery receiving recess 5. Thus, a battery replacement operation can be performed while preventing stoppage of electrical power supply to the electronic mobile instrument. Since a user can not determine which connector holds the almost drained battery from its appearance, a connector holding thereof can erroneously be swung by the user, there exists a risk that supply of the electricity to the electronic mobile instrument can be suddenly stopped. However, since, for example, the recess 22a of the connecting unit 22 accommodates the projection 23 of the battery 20 by a prescribed amount, its swinging movement is prevented even if a swinging force is erroneously applied during the above noted battery replacing operation. Thus, the battery 20 does not even then drop from the battery receiving recess 5.

A projection can be formed on a connecting unit, and a recess receiving the projection can be disposed at a leading end surface of a battery. Further, connecting units 21 and 22 can be configured to be slidable in widthwise directions of the electronic mobile instrument shown by an arrow A as illustrated in FIG. 3 to support and release the battery.

According to the above noted several embodiments of the present invention, electrical power is continuously supplied to the electronic mobile instrument regardless of a battery replacement operation.

Numerous modifications and variations of the present invention are possible in light of the above teachings. It is therefore to be understood that within the scope of the appended claims, the present invention may be practiced otherwise than as specifically described therein.

What is claimed as new and desired to be secured by Letters Patent of the United States is:

1. An electronic mobile instrument comprising:

a battery receiving section configured to receive a detachable battery; and a pair of connecting units each including plural electrodes configured to support the detachable battery at the battery receiving section, wherein each of said pair of connecting units is independently movable between an open position where the detachable battery is connected thereto and a closed position where the detachable battery is brought into the battery receiving section, said pair of connecting units electrically connecting the detachable battery with the electronic mobile instrument.

2. The electronic mobile instrument of claim 1, wherein said pair of connecting units have substantially the same shape and function.

3. The electronic mobile instrument of claim 1, wherein said pair of connecting units have substantially the same shape and function.

4. The electronic mobile instrument of claim 1, wherein at least one of said pair of connecting units includes a lock mechanism configured to inhibit movement of said at least one of the connecting units when in its closed position.

5. The electronic mobile instrument of claim 1, wherein at least one of said pair of connecting units includes a lock mechanism configured to inhibit movement of said at least one of the connecting units when in its closed position.

6. The electronic mobile instrument of claim 1, wherein said connecting units are disposed at respective opposed rear side corners of a body of the electronic mobile instrument.

7. The electronic mobile instrument of claim 1, wherein said connecting units are disposed at respective opposed rear side corners of a body of the electronic mobile instrument.

* * * * *